(12) United States Patent
Helander et al.

(10) Patent No.: US 11,244,013 B2
(45) Date of Patent: Feb. 8, 2022

(54) TRACKING THE EVOLUTION OF TOPIC RANKINGS FROM CONTEXTUAL DATA

(71) Applicant: International Business Machines Corporation, Armonk, NY (US)

(72) Inventors: Mary E. Helander, North White Plains, NY (US); Emily A. Ray, Hastings on Hudson, NY (US); Nizar Lethif, Kozhikode (IN); Joana Sofia Branquinho Teresa Maria, New York, NY (US); Kush R. Varshney, Ossining, NY (US); Hemank Lamba, Pittsburgh, PA (US)

(73) Assignee: International Business Machines Corporation, Armonk, NY (US)

( * ) Notice: Subject to any disclaimer, the term of this patent is extended or adjusted under 35 U.S.C. 154(b) by 287 days.

(21) Appl. No.: 15/995,653

(22) Filed: Jun. 1, 2018

(65) Prior Publication Data
US 2019/0370399 A1    Dec. 5, 2019

(51) Int. Cl.
*G06F 7/00* (2006.01)
*G06F 16/951* (2019.01)
(Continued)

(52) U.S. Cl.
CPC ...... *G06F 16/951* (2019.01); *G06F 16/24578* (2019.01); *G06F 16/285* (2019.01); *G06F 16/3334* (2019.01)

(58) Field of Classification Search
CPC .. G06F 16/951; G06F 16/285; G06F 16/3334; G06F 16/24578; G06F 16/9024; G06F 16/953; G06F 16/36; G06F 16/6215
See application file for complete search history.

(56) References Cited

U.S. PATENT DOCUMENTS 7,181,438 B1 *  2/2007  Szabo ................. G06F 21/6245
8,204,988 B2    6/2012  Lin et al.
(Continued)

FOREIGN PATENT DOCUMENTS

| CN | 104199974 A | 12/2014 |
|---|---|---|
| WO | 03/102740 A2 | 12/2003 |
| WO | 2015/178758 A1 | 11/2015 |

OTHER PUBLICATIONS

Entity-Centric Topic Extraction and Exploration: A Network-Based Approach; Andreas Spitz and Michael Gertz; Heidelberg University; Germany; Mar. 15, 2018 (Year: 2018).*
(Continued)

*Primary Examiner* — Mohammed R Uddin
(74) *Attorney, Agent, or Firm* — Scully, Scott, Murphy & Presser, P.C.; Daniel P. Morris

(57) ABSTRACT

The system, method, and computer program product are disclosed that track the evolution of a network over time through the analysis of media corpora associated with nodes of the network at each time slice. The media corpora may be analyzed to generate word clusters for each time slice that are then compared across time slices to determine how the network has evolved. The evolution may be tracked by determining the similarity of each word cluster of a particular time slice to each word cluster of another time slice. The similarity may be measured by a similarity score for each comparison that may be combined to determine an overall similarity of the network between the two time slices.

18 Claims, 8 Drawing Sheets

(51) Int. Cl.
  *G06F 16/28*     (2019.01)
  *G06F 16/33*     (2019.01)
  *G06F 16/2457*   (2019.01)

(56) References Cited

U.S. PATENT DOCUMENTS

| | | | |
|---|---|---|---|
| 8,255,402 B2* | 8/2012 | Wang | G06F 16/95 |
| | | | 707/737 |
| 8,452,781 B2* | 5/2013 | Stefik | G06F 16/3328 |
| | | | 707/749 |
| 8,676,937 B2 | 3/2014 | Rapaport et al. | |
| 8,909,643 B2 | 12/2014 | Ankan et al. | |
| 9,542,471 B2* | 1/2017 | Carlsson | G06F 16/284 |
| 9,552,399 B1* | 1/2017 | Browning | G06Q 50/01 |
| 9,836,552 B2* | 12/2017 | Diament | G06F 16/34 |
| 9,959,365 B2* | 5/2018 | Louni | G06F 16/9024 |
| 9,984,109 B2* | 5/2018 | da Silva | G06F 16/285 |
| 10,642,891 B2* | 5/2020 | Choe | G06F 16/73 |
| 10,643,139 B2* | 5/2020 | Chawla | G06F 16/9535 |
| 2003/0033333 A1* | 2/2003 | Nishino | G06F 16/9562 |
| | | | 715/255 |
| 2003/0050909 A1* | 3/2003 | Preda | G06F 16/951 |
| 2005/0050045 A1* | 3/2005 | Taira | G06F 16/951 |
| 2005/0144162 A1* | 6/2005 | Liang | G06F 16/152 |
| 2005/0198056 A1 | 9/2005 | Dumais et al. | |
| 2006/0106847 A1* | 5/2006 | Eckardt, III | G06F 16/3323 |
| 2007/0118498 A1* | 5/2007 | Song | G06F 16/337 |
| 2007/0239694 A1* | 10/2007 | Singh | G06F 16/9024 |
| 2008/0319746 A1* | 12/2008 | Okamoto | G06F 16/345 |
| | | | 704/245 |
| 2009/0006377 A1* | 1/2009 | Kobayashi | G06F 16/355 |
| 2009/0083261 A1* | 3/2009 | Nagano | G06F 16/951 |
| 2009/0327279 A1* | 12/2009 | Adachi | G06F 16/9535 |
| 2010/0205541 A1* | 8/2010 | Rapaport | G06Q 30/02 |
| | | | 715/753 |
| 2010/0235310 A1* | 9/2010 | Gage | G06N 3/082 |
| | | | 706/14 |
| 2010/0280985 A1* | 11/2010 | Duchon | G06Q 10/10 |
| | | | 706/52 |
| 2011/0022549 A1* | 1/2011 | Zhuang | G06F 16/00 |
| | | | 706/12 |
| 2011/0055379 A1* | 3/2011 | Lin | G06K 9/00677 |
| | | | 709/224 |
| 2011/0238408 A1 | 9/2011 | Larcheveque et al. | |
| 2012/0005224 A1* | 1/2012 | Ahrens | G06F 16/285 |
| | | | 707/769 |
| 2012/0042263 A1* | 2/2012 | Rapaport | G06Q 50/01 |
| | | | 715/753 |
| 2012/0290950 A1* | 11/2012 | Rapaport | H04N 21/8358 |
| | | | 715/753 |
| 2012/0331049 A1 | 12/2012 | Deeter et al. | |
| 2013/0151531 A1 | 6/2013 | Li et al. | |
| 2013/0232263 A1* | 9/2013 | Kelly | G06F 16/285 |
| | | | 709/224 |
| 2013/0311462 A1* | 11/2013 | Khan | G06F 16/353 |
| | | | 707/728 |
| 2014/0122586 A1* | 5/2014 | Kao | G06Q 50/01 |
| | | | 709/204 |
| 2014/0149417 A1* | 5/2014 | Kim | G06F 16/335 |
| | | | 707/740 |
| 2014/0181109 A1* | 6/2014 | Lin | G06F 16/24568 |
| | | | 707/737 |
| 2014/0297737 A1 | 10/2014 | Beckley et al. | |
| 2015/0120717 A1* | 4/2015 | Kim | G06F 16/335 |
| | | | 707/727 |
| 2015/0135058 A1* | 5/2015 | Metcalf | G06F 40/14 |
| | | | 715/234 |
| 2015/0142888 A1* | 5/2015 | Browning | G06F 16/285 |
| | | | 709/204 |
| 2015/0213022 A1* | 7/2015 | Agarwal | G06F 16/24575 |
| | | | 707/731 |
| 2015/0324482 A1* | 11/2015 | Kato | G06F 3/0481 |
| | | | 707/798 |
| 2016/0063590 A1* | 3/2016 | Subramanya | G06F 16/954 |
| | | | 705/26.61 |
| 2016/0239581 A1* | 8/2016 | Jaidka | G06F 16/345 |
| 2017/0132219 A1* | 5/2017 | Deng | G06F 16/113 |
| 2017/0206258 A1 | 7/2017 | Awasthi et al. | |
| 2017/0228445 A1* | 8/2017 | Chiu | G06F 16/24578 |
| 2017/0243382 A1 | 8/2017 | Banerjee et al. | |
| 2018/0032636 A1* | 2/2018 | Mullaney | G06F 40/295 |
| 2018/0191574 A1* | 7/2018 | Vishnia | H04L 65/4084 |
| 2018/0232644 A1* | 8/2018 | Acharya | G06N 7/005 |
| 2018/0349779 A1* | 12/2018 | Fliri | G06N 3/12 |
| 2019/0182382 A1* | 6/2019 | Mazza | G06F 16/3329 |

OTHER PUBLICATIONS

J. Kalyanam, et al., "Leveraging Social Context for Modeling Topic Evolution", In Proceedings of the 21th ACM SIGKDD International Conference on Knowledge Discovery and Data Mining (KDD '15), Aug. 10-13, 2015, pp. 517-526.

Madlock-Brown, C.R., "A Framework for Emerging Topic Detection in Biomedicine" Ph.D. (Doctor of Philosophy) Thesis, University of Iowa, Dec. 2014, 126 pages.

Zhu, M., et al., "Topic Detection and Tracking for Threaded Discussion Communities", IEEE/WIC/ACM International Conference on Web Intelligence and Intelligent Agent Technology, WI-IAT '08, Dec. 9-12, 2008, pp. 77-83.

Mihalcea, R., et al., "TextRank: Bringing Order into Texts", Proceedings of EMNLP 2004, Association for Computational Linguistics, Jul. 2004, pp. 404-411.

Mantrach, A., et al., "Method and System for Learning Topics on Evolving Time Data Streams Using A Non-Negative Matrix Factorization (NMF) Based Framework", An IP.com Prior Art Database Technical Disclosure, IP.com No. IPCOM000233851D, Dec. 24, 2013, pp. 1-4.

Liu, X., et al., "Topic detection Based on Similar Networks," 2017 IEEE International Conference on Systems, Man, and Cybernetics (SMC), Oct. 5-8, 2017, pp. 188-193.

Borgatti, S.P., "The Key Player Problem", In: Breiger R, Carley K, Pattison P (eds) Dynamic Social Network Modeling and Analysis: Workshop Summary and Papers. National Academy of Sciences Press, Washington, DC., 12 pages.

Borgatti, S.P., "Identifying sets of key players in a social network", Computational & Mathematical Organization Theory, Apr. 2006, pp. 21-34, vol. 12, Issue 1.

Borgatti, S.P., et al., "UCINET 6 for Windows: Software for Social Network Analysis" User's Guide, Analytic Technologies, Last Revised May 24, 2018, 47 pages.

Shah, D., et al., "Rumor Centrality: A Universal Source Detector", SIGMETRICS '12, Jun. 11-15, 2012, pp. 199-210.

Rui, W., et al., "Unsupervised Feature Selection for Text Classification via Word Embedding," 2016 IEEE International Conference on Big Data Analysis (ICBDA), Mar. 2016, 5 pages.

Wasserman, S., et al., "Social Network Analysis: Methods and Applications", Cambridge University Press, Nov. 25, 1994, Reprinted 1999, pp. 13, 169-202, 217 & 728.

Wikipedia, "PageRank", https://en.wikipedia.org/wiki/PageRank, Last edited May 27, 2018, Accessed on May 31, 2018, 16 pages.

Cambridge University Press, "Term frequency and weighting", https://nlp.stanford.edu/IR-book/html/htmledition/term-frequency-and-weighting-1.html, Apr. 7, 2009, Accessed on May 31, 2018, 2 pages.

The University of Iowa, "Unsupervised Learning", 22c:145 Artificial Intelligence, http://homepage.cs.uiowa.edu/~hzhang/c145/notes/chap18b.pdf, Accessed on May 31, 2018, 7 pages.

Wikipedia, "Natural-language processing", https://en.wikipedia.org/wiki/Natural-language_processing, Last edited May 29, 2018, Accessed on May 31, 2018, 9 pages.

Prince Ion University, "WordNet", https://wordnet.princeton.edu/publications, Accessed on May 31, 2018, 1 page.

Dorow, B., "A Graph Model for Words and their Meanings", http://citeseerx.ist.psu.edu/viewdoc/download?doi=10.1.1.94.1001&rep=rep1&type=pdf, Mar. 3, 2006, Accessed on Mar. 31, 2018, 187 pages.

(56) References Cited

OTHER PUBLICATIONS

Borgatti, S.P., "Centrality and network flow", Social Networks, Jan. 2005, pp. 55-71, vol. 27, Issue 1.
Freeman, L.C., "A Set of Measure of Centrality Based on Betweenness", Sociometry, Mar. 1977, pp. 35-41, vol. 40, No. 1.
Freeman, L.C., "Centrality in Social Networks Conceptual Clarification", Social Networks, 1978-1979, pp. 215-239, vol. 1, Issue 3.
Freeman, L.C., "Centrality in valued graphs: A measure of betweenness based on network flow", Social Networks, Jun. 1991, pp. 141-154, vol. 13, Issue 2.
Alahakoon, T., et al., "K-path centrality: A new centrality measure in social networks", In Proceedings of the 4th Workshop on Social Network Systems, SNS '11, Apr. 10, 2011, 6 pages.
Corley, H.W., et al., "Finding the n Most Vital Nodes in a Flow Network", Management Science, Nov. 1, 1974, Downloaded on Jun. 9, 2018, pp. 362-364, 21(3).
Nardelli, E., et al., "Finding the most vital node of a shortest path", Theoretical Computer Science, Mar. 2003, pp. 167-177, 296(1).
Valente, T.W., et al., "Bridging: Locating critical connectors in a network", Social Networks, Jul. 2010, pp. 212-220, 32(3).

* cited by examiner

TRACKING THE EVOLUTION OF TOPIC RANKINGS FROM CONTEXTUAL DATA

BACKGROUND

The present disclosure relates to systems and methods used to track the evolution of topics over time in a network based on their connections to important nodes in the network.

The popularity of various topics found on a network may change over time. For example, topics such as news stories, government statements, national or international events, movies, new technologies, or other similar topics, may see increased or decreased exposure in a network over time.

BRIEF SUMMARY

The system, method, and computer program product described herein provide tracking for the evolution of topics over time in a network.

In an aspect of the present disclosure, a method is disclosed including receiving time series data associated with a network that includes data about the network at a plurality of time slices. The network includes a plurality of nodes at each time slice where each node at each time slice includes an attribute associated with at least one media corpus. The method further includes analyzing the time series data to identify at least one most important node in the network for each time slice, determining a sub-network of the network at each time slice based on the identified at least one most important node at each time slice where the sub-network includes at least some of the nodes of the network and the identified at least one most important node, analyzing the at least one media corpus associated with the attribute of each node in the sub-network at each time slice to determine at least one key word cluster for that time slice where each key word cluster includes a plurality of key words, comparing the at least one key word cluster of a first time slice of the plurality of time slices to the at least one key work cluster of a second time slice of the plurality of time slices and determining based on the comparison, a similarity between the first time slice and the second time slice.

In aspects of the present disclosure, apparatus, systems, and computer program products in accordance with the above aspect may also be provided. Any of the above aspects may be combined without departing from the scope of the present disclosure.

BRIEF DESCRIPTION OF THE DRAWINGS

The details of the present disclosure, both as to its structure and operation, can be understood by referring to the accompanying drawings, in which like reference numbers and designations refer to like elements.

DETAILED DESCRIPTION

Tracking the evolution of popular topics in a network may provide insights into the underlying factors that drive the popularity of such topics. For example, a topic ranking for a particular topic on a network may be based on a variety of factors including the parties that are involved in the topic, who is sharing the topic, where in the network the topic is presented, or other similar factors. One factor that may be of particular importance is the connection between topic ranking and particular nodes.

For example, the evolution of topics may be modeled on top of a dynamic network of nodes which may be used to inform the identification and clustering of the topics by their inherent connections to the nodes in the network.

In some aspects, for example, topic word clusters may be tracked as a function of time and a most important sub-network at a corresponding time slice. The most important sub-network may be determined, for example, by analyzing attributes of the nodes of the network using commonly known techniques such as, e.g., centrality, betweenness, closeness, rumor centrality, information centrality, eigenvalue metrics, page rank, or other similar techniques.

Figure 1:
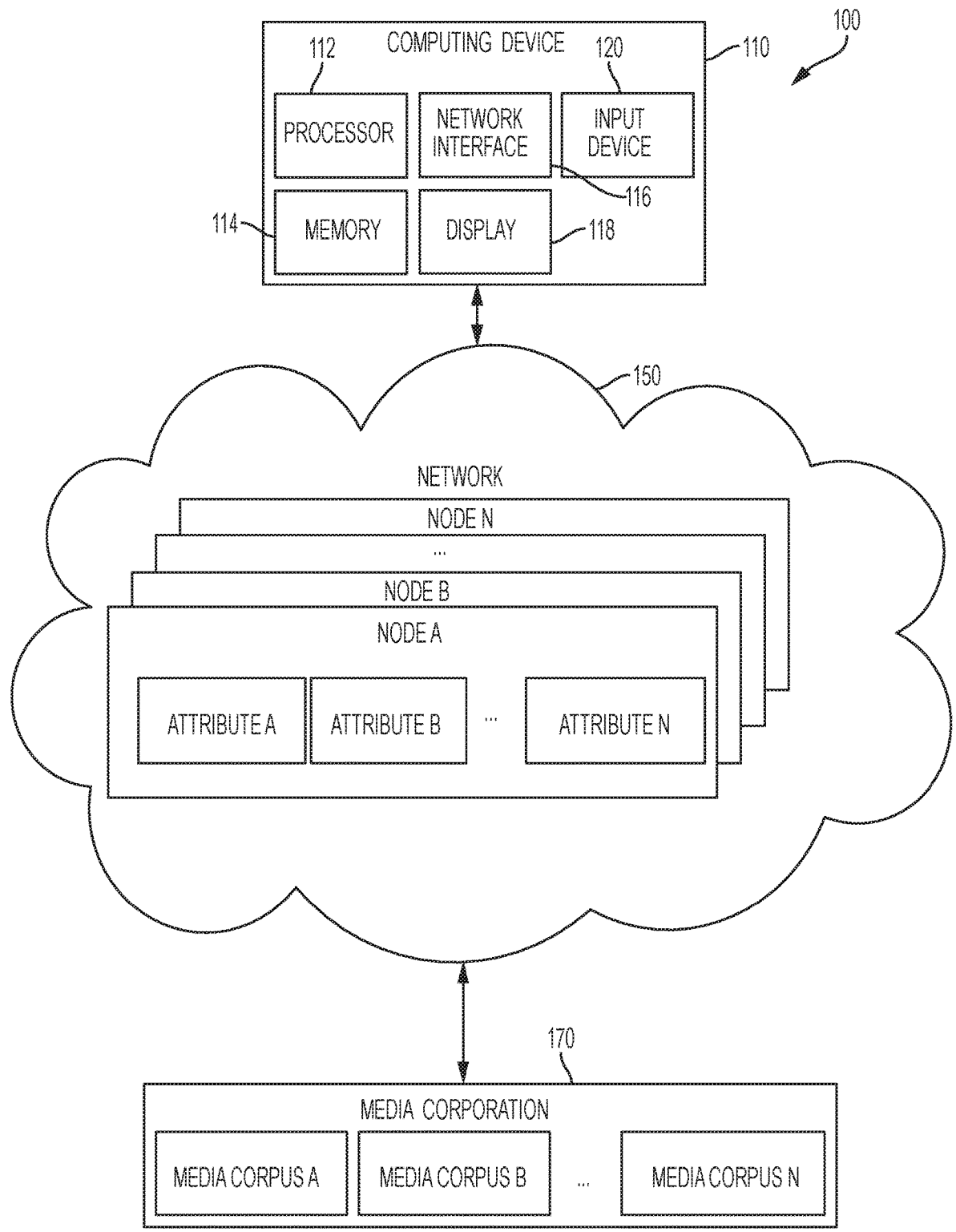
FIG. 1 is a system diagram illustrating a system for tracking topic evolution in a network in accordance with some aspects of the present disclosure.

With reference now to FIG. 1, a system 100 for tracking the evolution of topics in a relationship network over time is illustrated. In some aspects, system 100 includes a computing device 110, a network 150 of nodes A-N, and media corpora 170. Nodes A-N may include any number of nodes. Media corpora 170 may include any number of media corpora.

Computing device 110 includes at least one processor 112, memory 114, at least one network interface 116, a display 118, an input device 120, and may include any other features commonly found in a computing device. In some aspects, computing device 110 may, for example, be a computing device associated with a user that is configured to analyze a network of nodes to track the evolution of topics in the network over time. In some aspects, computing device 110 may include, for example, a personal computer, laptop, tablet, smart device, smart phone, smart watch, or any other similar computing device that may be used by a user. In some aspects, computing device 110 may include a server, web server, server array, or any other system that may be used to analyze and track the evolution of topics in a network of nodes.

Processor 112 may include, for example, a microcontroller, Field Programmable Gate Array (FPGAs), or any other processor that is configured to perform various operations. Processor 112 may be configured to execute instructions as described below. These instructions may be stored, for example, in memory 114. As used herein, the term "processor" may include a single core processor, a multi-core processor, multiple processors located in a single device, or multiple processors in wired or wireless communication with each other and distributed over a network of devices, the Internet, or the cloud. Accordingly, as used herein, functions, features or instructions performed or configured to be performed by a "processor", may include the performance of the functions, features or instructions by a single core processor, may include performance of the functions, features or instructions collectively or collaboratively by multiple cores of a multi-core processor, or may include performance of the functions, features or instructions collectively or collaboratively by multiple processors, where each processor or core is not required to perform every function, feature or instruction individually.

Memory 114 may include, for example, computer readable media or computer readable storage media in the form of volatile memory, such as random access memory (RAM) and/or cache memory or others. Memory 114 may include, for example, other removable/non-removable, volatile/non-volatile storage media. By way of non-limiting examples only, memory 114 may include a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In some aspects, memory 114 may store a specialized data structure for tracking the links and evolution between nodes in a network according to topic evolutions as described below.

Network interface 116 is configured to transmit and receive data or information to and from network 150 or any other computing device via wired or wireless connections. For example, network interface 116 may utilize wireless technologies and communication protocols such as Bluetooth®, WWI (e.g., 802.11a/b/g/n), cellular networks (e.g., CDMA, GSM, M2M, and 3G/4G/4G LTE), near-field communications systems, satellite communications, via a local area network (LAN), via a wide area network (WAN), or any other form of communication that allows computing device 110 to transmit or receive information to or from network 150 or nodes A-N.

Display 118 may include any display device that is configured to display information to a user of computing device 110. For example, in some aspects, display 118 may include a computer monitor, television, smart television, or other similar displays. In some aspects, display 118 may be integrated into or associated with computing device 110, for example, as a display of a laptop, smart phone, smart watch, or other smart wearable devices, as a virtual reality headset associated with computing device 110, or any other mechanism for displaying information to a user. In some aspects, display 118 may include, for example, a liquid crystal display (LCD), an e-paper/e-ink display, an organic LED display (OLED) display, or other similar display technologies. In some aspects, display 118 may be touch-sensitive and may also function as an input device 120.

Input device 120 may include, for example, a keyboard, a mouse, a touch-sensitive display 118, a keypad, a microphone, or other similar input devices or any other input devices that may be used alone or together to provide a user with the capability to interact with computing device 110.

Network 150 includes a plurality of nodes A-N. Each node may include a processor, memory, and a network interface that may include similar functionality as processor 112, memory 114, and network interface 116. In some aspects, each node A-N may be, for example any computing device, server, or similar system that is configured to interact with or provide data to computing device 110.

Media corpora 170 include a plurality of media corpora A-N. Each media corpus includes media associated with a particular topic. For example, a media corpus A may include media related to the topic of energy sources or production, e.g., a topic related to green, energy, solar, gasoline, frakking, drilling, or other similar topics, a media corpus B may include media related to financial topics such as, e.g., finance, mortgage, micro lending, banking, interest rate, credit, or other similar topics, a media corpus C may include media related to the topic of animals, e.g., elephant, zebra, moose, shark, horse, cat, or other similar topics, a media corpus D may include media related to the topic of continents including, e.g., Africa, Asia, North America, South America, Europe, Antarctica, or other similar topics. In some aspects, for example, media may be any form a media including text, image, video, audio, or any other means of storing and disseminating information that may be stored in memory, e.g., memory of a computing device 110, server 150, or any other memory.

Each node in network 150 may include one or more attributes that are each associated with a particular media corpus. For example, node A may include attributes A-N where attribute A may be associated with media corpus A, attribute B may be associated with media corpus B, . . . , and attribute N may be associated with a media corpus N. Each node may include any number of attributes.

In some aspects, each node may alternatively include a single attribute that is associated with more than one media corpus, e.g., an attribute called media corpora. For example, the media corpora attribute may identify each media corpus that is associated with the node.

In some aspects, the media corpora, which are associated with the attributes included in each node, may change over time. For example, node A may initially include one or more attributes associated with media corpora A and B. Over time, for example, media corpus A may no longer be actively associated with node A. Node A may remove the association with document corpus A and instead add an association with a media corpus C that has a topic that is currently active or trending on node A. For example, if a media corpus A including frakking is no longer active on node A, but an international event such as an earthquake that is found in a media corpus C is now active on node A, node A may remove the association with media corpus A and add an association with media corpus C which includes international events or earthquakes.

In some aspects, the nodes included in network 150 may also change over time. For example, if a node goes off-line, or no longer matches the purpose of the network 150, the node may be removed. Similarly, new nodes may be added. For example, in a social network, as new contacts are "friended", new nodes may be added to network 150.

Likewise, if contacts are removed from being "friends", nodes associated with those contacts may be removed. In a physical network of computing device 110, for example, a machine which is offline may be removed from the network while machines that come online may be added to the network. In some aspects, any connection between nodes may be added or removed to alter the network.

In some aspects, each node in a network may be connected to another node by an edge. For example, a node having direct connections to three other nodes may be said to have three edges. In some aspects, for example, discrete objects in a network such as, e.g., contacts, machines, or other similar objects, may become nodes while the interconnections or relationships between these objects may become edges.

In some aspects, particular configurations and connections between the nodes in network 150 at each time slice may, for example, be stored as a time series in a specialized data structure. For example, the specialized data structure may track edges between the nodes as the network evolves at each time slice.

Figure 2:
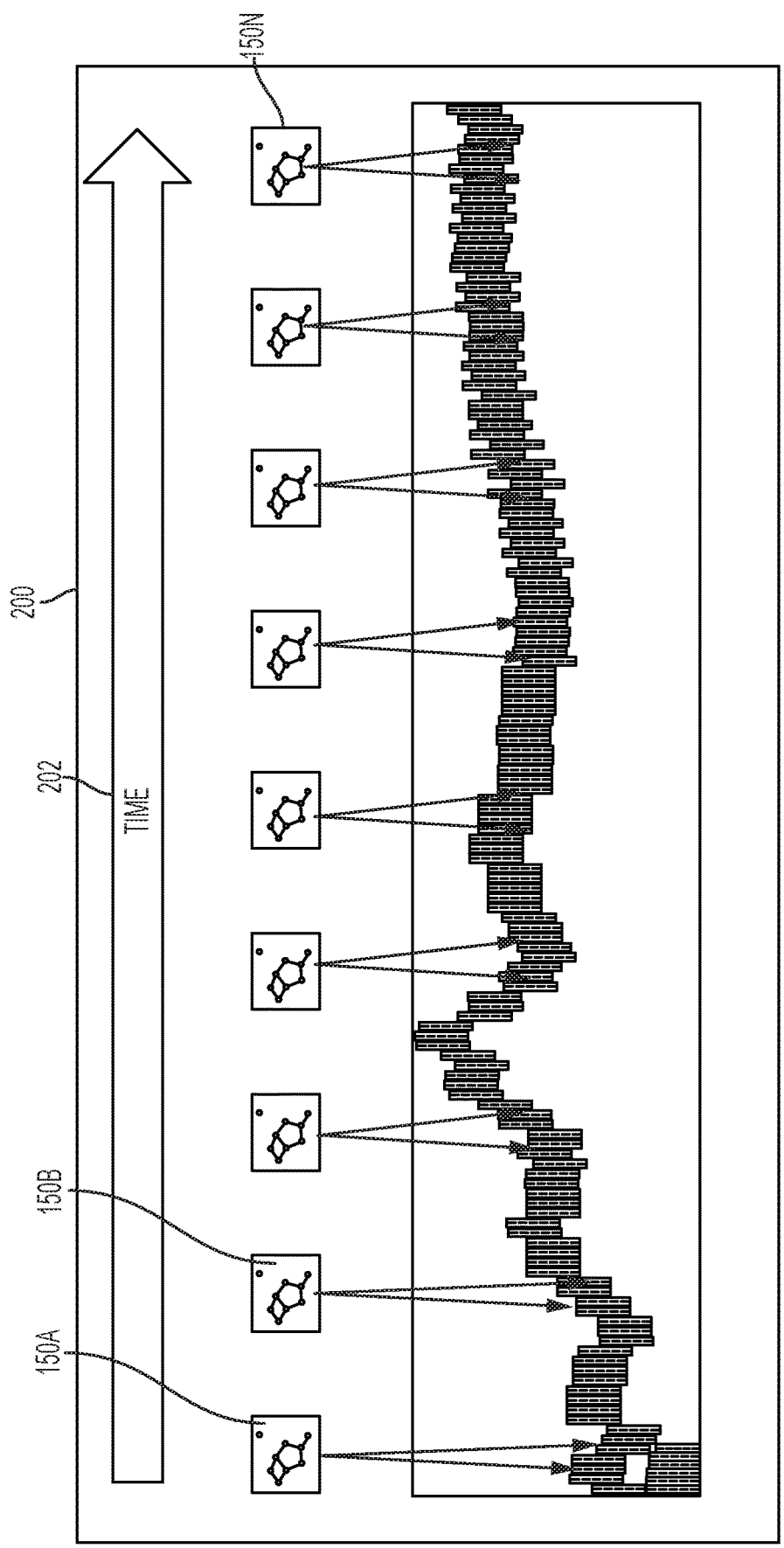
FIG. 2 is an illustration of a time series of a network in accordance with some aspects of the present disclosure.

With reference now to FIG. 2, for example, a time series 200 of network 150 is illustrated that represents an evolution of topics. For example, on a time scale 202, network 150 changes over time, e.g., from a network 150A, to a network 150B, . . . , to a network 150N. In some aspects, the specialized data structure may store and implement the tracking of the particular configurations and connections of network 150 at each time slice of time series 200.

Figure 3A:
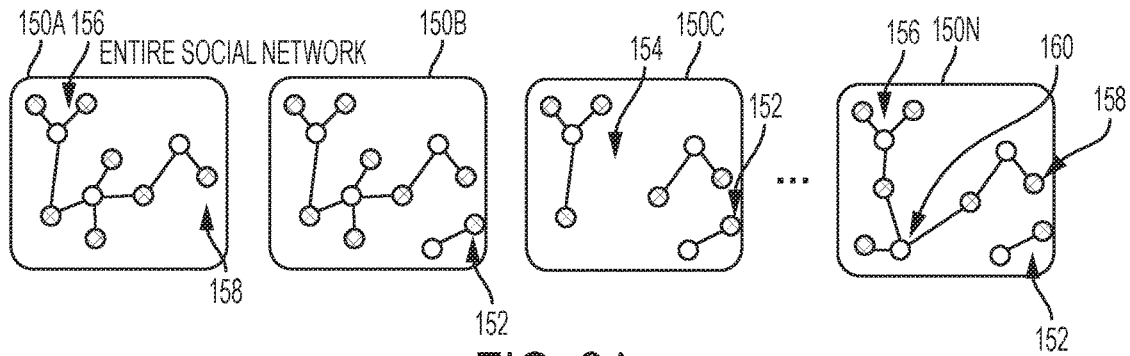
FIG. 3A is a diagram illustrating the evolution of a network over time in accordance with some aspects of the present disclosure.

As seen in FIG. 3A, for example, the evolution of the network 150 from time t=1 to time t=t+n is illustrated. For example, network 150A represents network 150 at time t=1, network 150B represents network 150 at time t=2, network 150C represents network 150 at time t=3, and network 150N represents network 150 at time t=t+n. As can be seen, at each time step t, the nodes included in network 150 may evolve or change. For example, at time t=2, network 150B shows that additional nodes 152 have been added to network 150 relative to network 150A. Likewise, at time t=3, network 150C shows a gap 154 where some nodes that were originally present at time t=1 in network 150A have been removed while nodes 152 added at time t=2 in network 150B are still present. At time t=t+n, network 150N shows yet another evolution between the nodes in the network 150 where nodes 156 and 158 from network 150A are still present, nodes 152 added at time t=2 are still present, but new nodes 160 have been added that replace those nodes removed at time t=3. As can be seen from network representations 150A-150N, the nodes included in network 150 change or evolve over time. For example, nodes may be added to the network and removed from the network, connections between nodes may be added or removed, or other similar changes to the network may occur over time. In some aspects, the specialized data structure may store and implement the tracking of the particular configurations and connections of network representations 150A-150N.

Figure 3B:
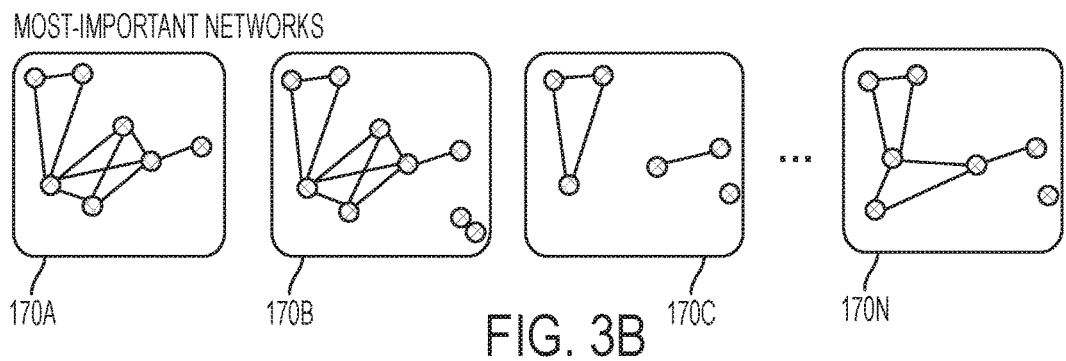
FIG. 3B is a diagram illustrating the evolution of a most important sub-network over time in accordance with some aspects of the present disclosure.

With continued reference to FIG. 3B, the most important sub-network of nodes in the network 150 at each time t may be identified based on the state of network 150 at each time t. For example, the most important node or nodes may be identified using methodologies including, for example, fragmentation rank, centrality, betweenness, closeness, rumor centrality, information centrality, eigenvalue metric, and page rank.

In some aspects, for example, the nodes and edges of network 150 may be used as an input to determine the most important node or nodes in the network 150. For example, a first node may have one or more edges that connect to other nodes. This type of connection may be referred to as a $1^{st}$ level connection where, for example, connected nodes may be considered $1^{st}$ level nodes with respect to the first node. Each of the $1^{st}$ level nodes may also have one or more edges that connect to other nodes. These connections may be referred to as $2^{nd}$ level connections where, for example, connected nodes may be considered $2^{nd}$ level nodes with respect to the first node. Further levels of connections or nodes may also be present.

Using the centrality methodology as an example, the node or nodes with the largest number of edges may be determined to be the most important node or nodes. In some aspects, a node having a number of edges above a pre-determined amount may be determined to be a most important node.

In some aspects, a node's connections (e.g., $1^{st}$ level, $2^{nd}$ level, $3^{rd}$ level, or any other level) may be examined to determine which nodes have the largest number of connections, the largest number of connections below a certain level, e.g., $2^{nd}$ level. This determination may be used to identify which nodes are "central" to the network, e.g., the most important node or nodes based not only on their direct edge connections but also the connections of those direct connects, e.g., $2^{nd}$ level connections.

In some aspects, the most important node or nodes in a network 150 may also or alternatively be determined based on a combined analysis of network 150 for more than one time slice. For example, a combined analysis of every time slice t=1, t=2, . . . t=t+n may be performed. For example, the techniques described above may be utilized to determine which nodes are the most important nodes in the network 150 over all of the time slices, over a group or subset of the time slices, or over a single time slice, as described above.

In some aspects, the analysis of the nodes in a network 150 at a time slice t to identify the most important node or nodes may output a score for each node. For example, using the centrality technique as an example, the output score for a node may represent the degree of centrality, e.g., the number of edges that touch the node. The scores of the nodes in the network 150 may then be compared to determine the most important node or nodes. For example, the node or nodes with the highest score may be considered the most important node or nodes. In some aspects, the nodes that have scores above a pre-determined threshold may be considered the most important nodes. Other types of scores may also be output depending on the particular technique used. For example, nodes may be scores on other or additional criteria including, e.g., number of active users, number of active or recent posts, or other similar criteria.

Once the most important node or nodes are identified, a sub-network of nodes associated with the most important node or nodes may be identified for use in determining the evolution of the network. For example, the nodes connected to the most important node or nodes may be included in the most important sub-network. In some aspects, those nodes that are $1^{st}$, $2^{nd}$ or any other level connections to the most important node or nodes may be included in the most important sub-network.

As an example, the most important sub-network network 170A at time t=1 may be identified to include a sub-set of the nodes found in network 150A, the most important sub-network network 170B at time t=2 may be identified to include a sub-set of the nodes found in network 150B, the most important sub-network 170C at time t=3 may be identified to include a sub-set of the nodes found in network 150C, and the most important sub-network 170N at time t=t+n may be identified to include a sub-set of the nodes found in network 150N. In some aspects, the specialized data structure may store and implement the tracking of the particular configurations and connections of the most important sub-networks.

With the most important sub-network identified at each time t, the nodes of the most important sub-networks may be mined for key words and clusters. For example, at each time window t, the media corpora associated with the attributes of only the nodes in the most important sub-network may be analyzed to identify word/thematic clusters using techniques such as, e.g., word/selection embedding, frequency weighting, unsupervised clustering, natural language processing, or other similar techniques. In some aspects, for example, the media corpus or group of media corpora associated with a particular node may be mined and analyzed individually for that node to determine one or more word/thematic clusters for that node. In some aspects, for example, the media corpora associated with all of the nodes in the most important sub-network may be mined and analyzed collectively to identify word/thematic clusters that are associated with multiple nodes in the subset.

Figure 3C:
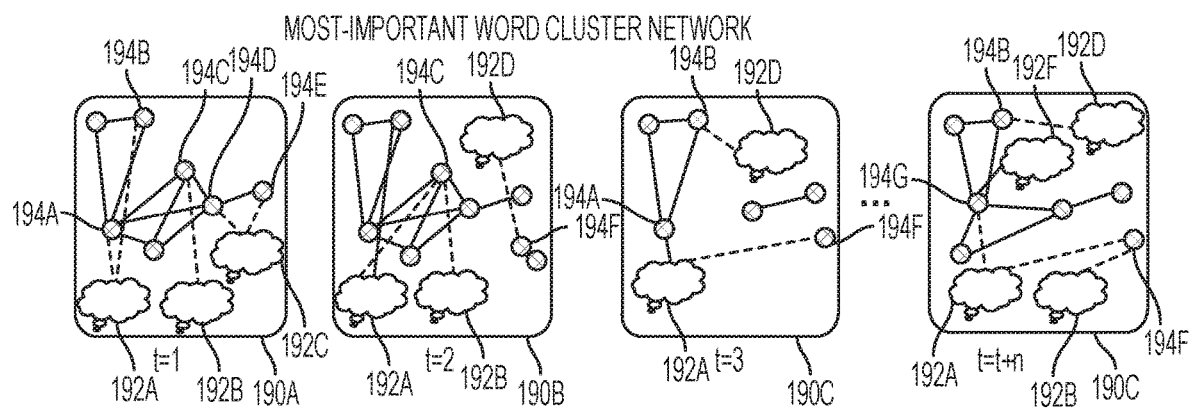
FIG. 3C is a diagram illustrating the evolution of a word clusters in a network over time in accordance with some aspects of the present disclosure.

Each identified word/thematic cluster may be linked to the nodes from which it was identified based on the attributes and associated media corpus, for example as illustrated in FIG. 3C. For example, the identified word/thematic clusters may be compared to the words or themes found in each node's attributes and associated media corpora using techniques such as, e.g., group similarity, semantic overlap, or any other similar techniques. In some aspects, some or all of these techniques may be combined or used together in the comparison.

As an example, with reference now to FIG. 3C, a most important sub-network 190A at time t=1 may include word clusters 192A-C and linked nodes 194A-E. For example, word cluster 192A may be linked to nodes 194A and 194B, word cluster 192B may be linked to node 194C, and word cluster 192C may be linked to nodes 194D and 194E based on the comparison.

At time t=2, for example, a most important sub-network 190B may include word clusters 192A, 192B, and a new word cluster 192D, while word cluster 192C may no longer be present. As seen in most important sub-network 190B, word cluster 192A is no longer linked to nodes 194A and 194B but is now linked to node 194C, word cluster 192B is still linked to node 194C, and new word cluster 192D is linked to a new node 194F. Most important sub-network 190B illustrates the evolution of the nodes in the most important sub-network and how the word clusters and their linked nodes may change over time.

At time t=3, for example, a most important sub-network 190C may include word clusters 192A and 192D, while word cluster 192B may no longer be present. As seen in most important sub-network 190C, word cluster 192A is no longer linked to node 194C but instead is now linked to node 194F and is once again linked to node 194A. Word cluster 192D is linked to node 194B and no longer linked to node 194F. Most important sub-network 190C further illustrates the evolution of the nodes in the most important sub-network and how the word clusters and their linked nodes may change over time, for example, by de-linking and re-linking to a node in a later time period as shown by word cluster 192A delinking to node 194A at time t=2 and re-linking to note 194A at time t=3.

At time t=t+n, for example, a most important sub-network 190N may include word clusters 192A, 192B, 192D, and a new word cluster 192E. As seen in most important sub-network 190N, word cluster 192A is still linked to node 194F but is now linked to a new node 194G. Word cluster 192B is once again identified and is linked to node 194F. Word cluster 192D is still linked to node 194B, and new word cluster 192E is linked to node 194G. Most important sub-network 190N further illustrates the evolution of the nodes in the most important sub-network and how the word clusters and which nodes they are linked to may change over time. For example, word clusters may stay the same, be added, be removed, and be modified over time in the network depending on how the associations between nodes and media corpora change in the network. Likewise, links between word clusters and nodes may stay the same, be added, and be removed over time in the network depending on how the associations between nodes and media corpora change in the network.

In addition to linking word clusters to nodes by comparing the word cluster terms to the words/terms of the attributes and associated media corpora of each node in the most important sub-network, a strength of the comparison may also be determined and may be used to track the evolution of the keywords and word clusters between time slices through examination of word clusters in subsequent time slices. For example, a similarity score may be calculated between each cluster in a time slice and each cluster in all other time slices. The types of evolutions between time slices may be classified based on the value of the similarity score. Similarity scores may be determined, for example, using techniques such as, e.g., string matching, semantic matching on the word and cluster level, shortest path between words in a lexical relation graph such as, e.g., WordNet™ of Princeton University, using node to word cluster relationships, or using other similar techniques. The comparison may be performed for each word cluster in each time window.

In some aspects, the specialized data structure may store and implement the tracking of the particular configurations and connections between the word clusters and nodes.

Figure 4:
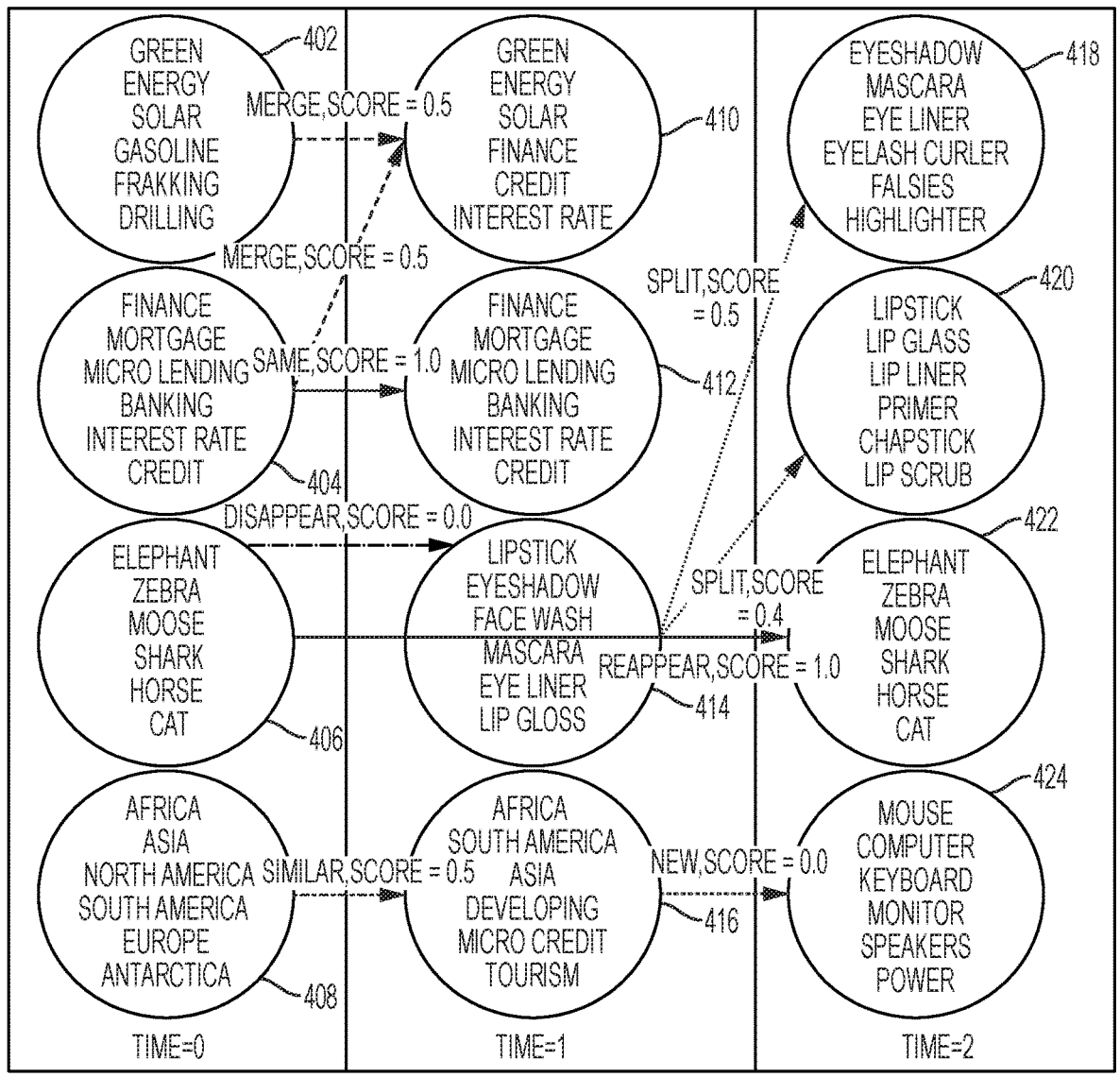
FIG. 4 is a diagram of the evolution of key word clusters between time slices in accordance with some aspects of the present disclosure.

With reference now to FIG. 4, each word cluster may include associated terms or keywords that may be identified as described above and may be used as part of the word cluster. For example, at time t=0, a word cluster 402 may include key words of "green", "energy", "solar", "gasoline", "frakking", and "drilling", a word cluster 404 may include key words of "finance", "mortgage", "micro lending", "banking", "interest rate", and "credit", a word cluster 406 may include key words of "elephant", "zebra", "moose", "shark", "horse", and "cat", and a word cluster 408 may include key words of "Africa", "Asia", "North America", "South America", "Europe", and "Antarctica".

As the key words included in each word cluster change over time, these changes may receive similarity scores to determine the evolution of topics over time in a network. For example, in some aspects, each word cluster in a particular time slice may be compared to the word clusters found in each other time slice to determine how the key words found in that word cluster evolve through the network over time. In some aspects, for example, the changes may be classified by a type of evolution of the key words for each word cluster based on the similarity score. As illustrated in FIG. 4, non-limiting example evolution types may include "merge", "same", "disappear", "split", "reappear", "similar", and "new". Any other types may be used. Note that while similarity scores as mentioned herein may have a value from 0.0 to 1.0, any other metric for scoring or rating a value or comparison may also or alternatively be used.

As shown in FIG. 4, a "merge" evolution type may involve the combination of key words from two or more word clusters into a single word cluster. The score for a "merge" type evolution may be based on the number of key words that are merged into the new word cluster. For example, at time t=1, the key words included in word cluster 410 are a merge of the key words "green", "energy", and "solar" from word cluster 402 at time t=0 and "finance", "credit", and "interest rate" from word cluster 404 at time t=0. Since each "merge" includes only half of the total number of key words from each source, the similarity score for each "merge" in this case is 0.5. Note that if, for example, the key word "wind" was added to word cluster 410 at time t=1 instead of "solar", the similarity score for the "merge" evolution from word cluster 402 of time t=0 may be reduced, e.g., to 0.33 since "wind" was not present in any of word clusters 402, 404, 406, or 408 at time t=0.

With continued reference to FIG. 4, a "same" evolution type may involve word clusters having the same key words in both time periods. The similarity score for a "same" type evolution is equal to 1.0 since no change has been made to the key words of the word cluster. For example, at time t=1, the key words included in word cluster 412 are the same as the key words included in word cluster 404 at time t=0.

With continued reference to FIG. 4, a "disappear" evolution type may involve a case where the key words found in a word cluster at a particular time period are no longer present in any word cluster at another later time period. The similarity score for a "disappear" type evolution is equal to 0.0 since the key words have not carried over to any word cluster in the new time period. For example, word cluster 406 at time t=0, includes "elephant", "zebra", "moose", "shark", "horse", and "cat". At time t=1, no word cluster includes the original key words of "elephant", "zebra", "moose", "shark", "horse", and "cat" found in word cluster 406. This may indicate, for example, that the key words found in word cluster 406 at time t=0, e.g., "elephant", "zebra", "moose", "shark", "horse", and "cat", were no longer trending or popular at time t=1. Since the key words "elephant", "zebra", "moose", "shark", "horse", and "cat" have disappeared at time t=1, a "disappear" type evolution has occurred with a similarity score of 0.0.

With continued reference to FIG. 4, a "split" evolution type may involve a case where some of the key words found in a word cluster at a particular time period are now present two or more other word clusters at another later time period. The similarity score for a "split" type evolution may be equal to the proportion of the key words that are split to the two or more other word cluster in the new time period. In some aspects, the similarity score may be rounded down or up such that the similarity score maintains a particular precision, e.g., one decimal place, two decimal places, or any number of decimal places. For example, word cluster 414 at time t=1, includes "lipstick", "eyeshadow", "face wash", "mascara", "eye liner", and "lip gloss". At time t=2, word cluster 418 includes "eyeshadow", "mascara", "eye liner", from word cluster 414 of time t=1, and new key words "eyelash curler", "falsies", and "highlighter". At time t=2, word cluster 420 now includes "lipstick" and "lip gloss" from word cluster 414 of time t=1, and new key words "lip liner", "primer", "chapstick", and "lip scrub". Accordingly, word cluster 414 from time t=1 has been partially split between word clusters 418 and 420 in a "split" type evolution. The split from word cluster 414 at time t=1 to word cluster 418 at time t=2 receives a similarity score of 0.5 since half (three of six) of the key words from word cluster 414 at time t=1 have been included in word cluster 418 at time t=2.

The split from node 414 at time t=1 to word cluster 420 at time t=2 receives a similarity score of 0.4 since two of six key words from word cluster 414 at time t=1 have been included in word cluster 420 at time t=2. For example, the similarity score of 0.4 may be rounded up from 0.33. In some aspects, a non-rounded up similarity score may be used.

With continued reference to FIG. 4, a "reappear" evolution type may involve a case where the key words found in a word cluster at a particular time period disappear in an adjacent or subsequent time period and reappear in a word cluster in a later time period. The similarity score for a "reappear" type evolution is equal to the proportion of the key words that reappear after a disappearance. For example, word cluster 406 at time t=0, includes key words "elephant", "zebra", "moose", "shark", "horse", and "cat". At time t=1, none of key words "elephant", "zebra", "moose", "shark", "horse", and "cat" are included in any of the word clusters of the network. At time t=2, however, word cluster 422 includes the key words "elephant", "zebra", "moose", "shark", "horse", and "cat". Thus, these key words have reappeared in the network at time t=2. Since each of "elephant", "zebra", "moose", "shark", "horse", and "cat", has reappeared in word cluster 422 at time t=2, a score of 1.0 may be assigned. If fewer key words re-appear, the score may be reduced. For example, if only half of the key words reappear, the score may be 0.5.

With continued reference to FIG. 4, a "similar" evolution type may involve partially retaining the key words for a word cluster from one time period to another. The score for a "similar" type evolution may be based on the number of key words that are retained in the word cluster. For example, at time t=0, the key words included in word cluster 408 are "Africa", "Asia", "North America", "South America", "Europe", and "Antarctica". At time t=1, word cluster 416 includes "Africa", "South America", "Asia", "developing", "micro credit", and "tourism". Since "Africa", "South America", and "Asia" are included in word cluster 416 at time t=1, a "similar" evolution type has occurred between word cluster 408 at time t=0 and word cluster 416 at time t=1. The score may be based on the proportion of key words that have been retained in the word clusters of the network. For example, three of six key words have been retained so the score for this "similar" evolution type may be 0.5.

With continued reference to FIG. 4, a "new" evolution type may involve the introduction of an entirely new set of key words for a word cluster in a new time period that were not present in word clusters in the network in a prior time period. In some aspects, a "new" evolution type may only occur when the newly introduced key words have not been present in the word clusters of the network for any preceding time period. The score for a "new" type evolution is 0.0 indicating that these key words are entirely new and were not trending over time. As an example, at time t=1, the key words included in node 416 are "Africa", "South America", "Asia", "developing", "micro credit", and "tourism". At time t=2, word cluster 424 includes entirely new key words "mouse", "computer", "keyboard", "monitor", "speakers", and "power" that were not present in word cluster 416 or any other word cluster in any prior time period. Thus a "new" evolution type has occurred and a score of 0.0 is assigned.

In some aspects, the comparison of key words between key word clusters may include direct key word to key word comparisons, e.g., if the word cluster 402 at time t=0 includes the key word "green" and one of the word clusters at time t=1 also includes the word "green" there is a similarity between the word clusters. In some aspects, semantic matching may be used where, for example, key words that are associated with each other or have similar meaning may be considered matching, for example, key words "green" and "teal" may both be semantically considered to be a green color and thus may be considered to match. In some cases, the semantic comparison may be based on analysis of the context in which the key word was used in the media corpora. For example, the key word "green" as referenced to green technology such as, e.g., wind farms and solar power, would not be semantically matched to other "green" colors based on an analysis of the context in which the key word "green" was used.

In some aspects, the similarity scores determined for each type of evolution between each pair of time slices may be aggregated to form a combined similarity score. For example, the similarity scores between time slice t=0 and time slice t=1 may be the aggregate of the merge score of 0.5 between word cluster 402 at time t=0 and word cluster 402 at time t=1, the merge score of 0.5 between word cluster 404 at time t=0 and word cluster 402 at time t=1, the disappear score of 0.0 between word cluster 406 at time t=0 and word cluster 406 at time t=1, and the similar score of 0.5 between word cluster 408 at time t=0 and word cluster 408 at time t=1. For example, the combined similarity score for the evolution between time t=0 and t=1 may be 2.5.

As another example, the similarity scores between time slice t=1 and time slice t=2 may be the aggregate of the split score of 0.5 between word cluster 406 at time t=1 and word cluster 402 at time t=2, the split score of 0.4 between word cluster 406 at time t=1 and word cluster 404 at time t=2, the reappear score of 0.0 between word cluster 406 at time t=0 and word cluster 406 at time t=2, and the new score of 0.0 between word cluster 408 at time t=1 and word cluster 408 at time t=2. For example, the combined similarity score for the evolution between time t=1 and t=2 may be 1.9.

In some aspects, the combined similarity scores for the evolutions between each time slice t may be analyzed to forecast future evolutions and determine trends in the network. For example, if the combined similarity scores indicate that the network is evolving, new or emerging topics or word clusters may be identified and provided to product development teams for designing new products that match the trending topic.

In another aspect, for example, a network or application executing on a network may be monitored using the above described topic evolution analysis to determine whether a change in the network indicating a potential security breach or other issue in the network has occurred, e.g., by analyzing the combined similarity scores to determine that a significant portion of the network has evolved. In response to such a determination, an alarm or corrective action may be triggered to counteract the evolution or isolate the potential security breach or nodes affected by the potential security breach thereby improving computer security.

In some aspects, the specialized data structure may store and implement tracking of the changes to word clusters at each time slice and their corresponding connections.

Figure 5:
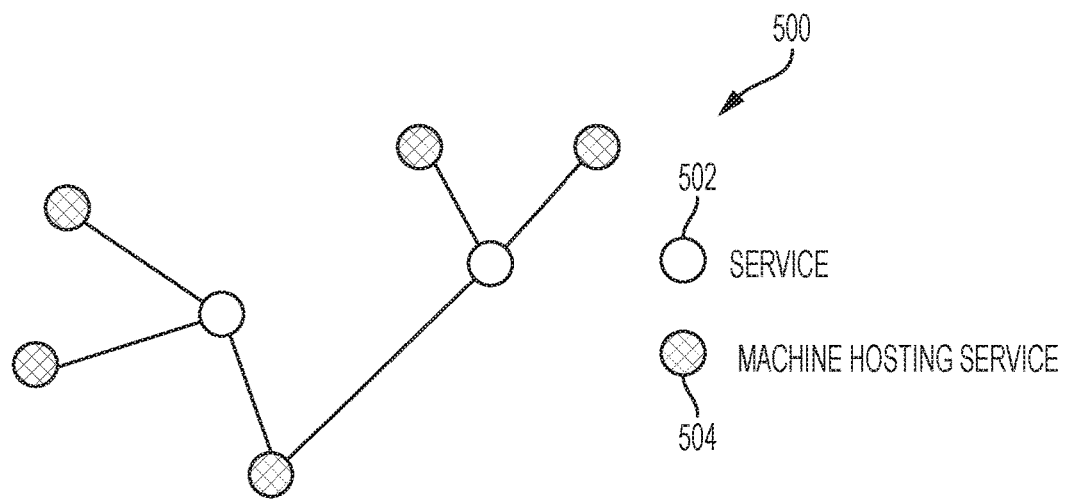
FIG. 5 is a diagram of an example network in accordance with some aspects of the present disclosure.

With reference now to FIG. 5, an example network 500 is illustrated. Example network 500 includes services 502 and machines 504 that host the services 502. For example the machines 504 may host services such as, e.g., printing services, network services, data storage and retrieval services, microservices, or any other service performed by a network. Machines 504 may be considered to be nodes of the network 500. For example, network 500 may include some or all of the features described above with respect to network 150 (FIG. 1) and services 502 and machines 504 may include some or all of the features described above with respect to nodes A-N (FIG. 1).

In example network 500, a complex application is deployed on multiple machines. The application includes multiple services, which may include multiple instances. Network 500 may be a heterogeneous network of machines 504 hosting one or more services 502. Each machine may generate a log file as a media corpus and may include an associated attribute. In this example, the log files generated by the machines may be analyzed to identify the most important machines at any given point in time or at a future time. The identification of most important machines may be used, for example, for planning a maintenance schedule for the machines on the network, planning future usage capacity of the network, determining whether a distributed denial of service (DDOS) or other attack is occurring, or other similar uses.

Figure 6:
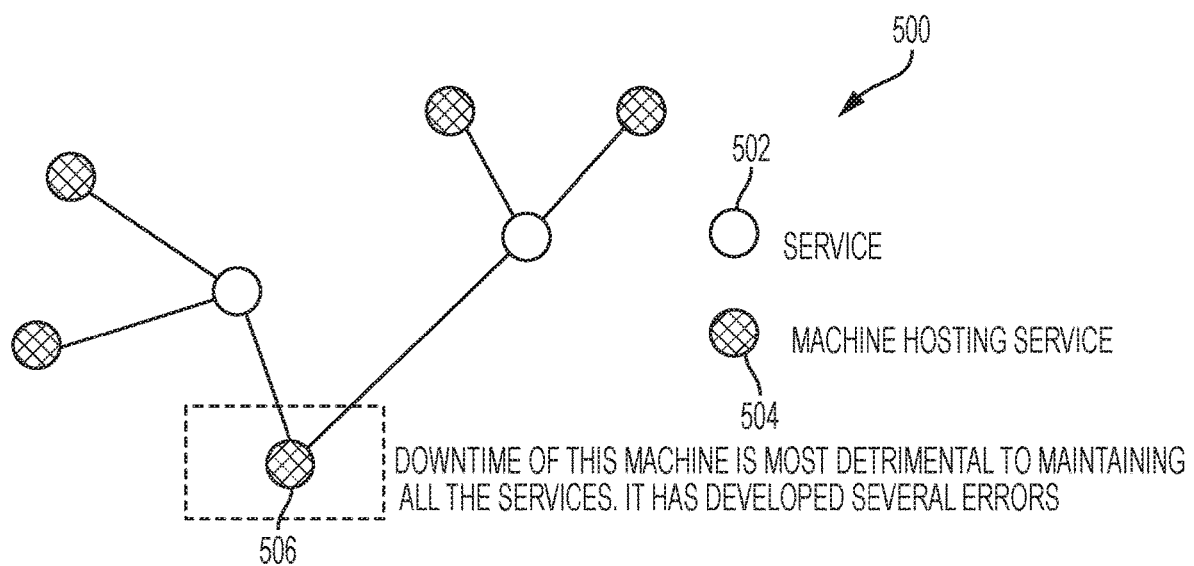
FIG. 6 is a diagram of the example network of FIG. 5, illustrating an identification of the most important node in accordance with some aspects of the present disclosure.

With reference now to FIG. 6, the most important machine or machines 506 in the network 500 may be identified based on the particular data found in the machine logs. For example, the machine logs for each of the machines may be analyzed using any of the above mentioned methodologies to identify the most important machine or machines. In this example, the most important machine or machines may be identified as those that have the most errors, will result in the largest decrease of robustness in the system, or other similar features affecting the network 500 based on the data in the log files. For example, a machine 506 that may be identified as the most important machine in the network 500 because it is the most detrimental to maintaining all of the services due to the errors found in the log file associated with that machine. In some aspects, machine 506 may be identified as the most important machine in the network 500 based on its centrality to the other nodes, e.g., machine 506 has the most 1st and 2nd level connections.

In some aspects, a sub-network of machines 204 may be identified that are associated with the most important machine or machines. For example, the sub-network may include those machines having $1^{st}$ or $2^{nd}$ level connections to the most important machine or machines, those machines performing the same services 502 as the most important machine or machines, or other similar associations.

Figure 7:
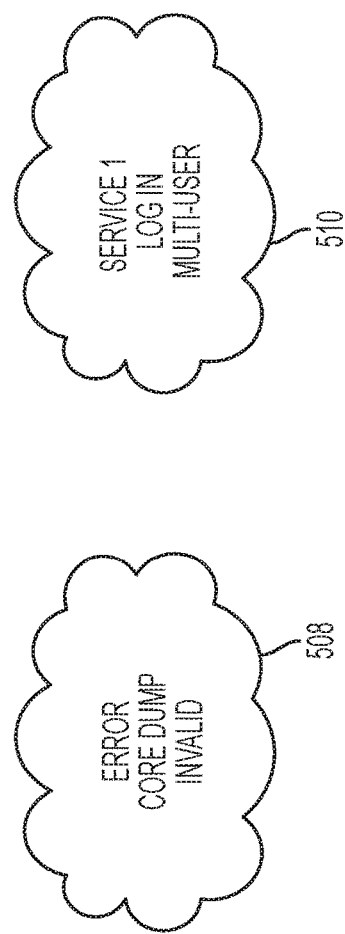
FIG. 7 is a diagram of two word clusters in accordance with some aspects of the present disclosure.

With reference now to FIG. 7, the log files from the most important machine or machines, in this case machine 506, may be analyzed as described above to detect thematic and key word clusters. For example, the analysis may identify a thematic or key word cluster 508 that includes the key words "error", "core dump", and "invalid". The analysis may also identify a thematic or key word cluster 510 that includes the key words "service 1", "log in", and "multi-user". In some aspects, the thematic or key word clusters 508 and 510 may also be identified based on analysis of machines found in the identified sub-network of machines associated with the most important machine 506, e.g., those machines having $1^{st}$ or $2^{nd}$ level connections to the most important machine or machines, those machines performing the same services 502 as the most important machine or machines, or other similar machines.

Figure 8:
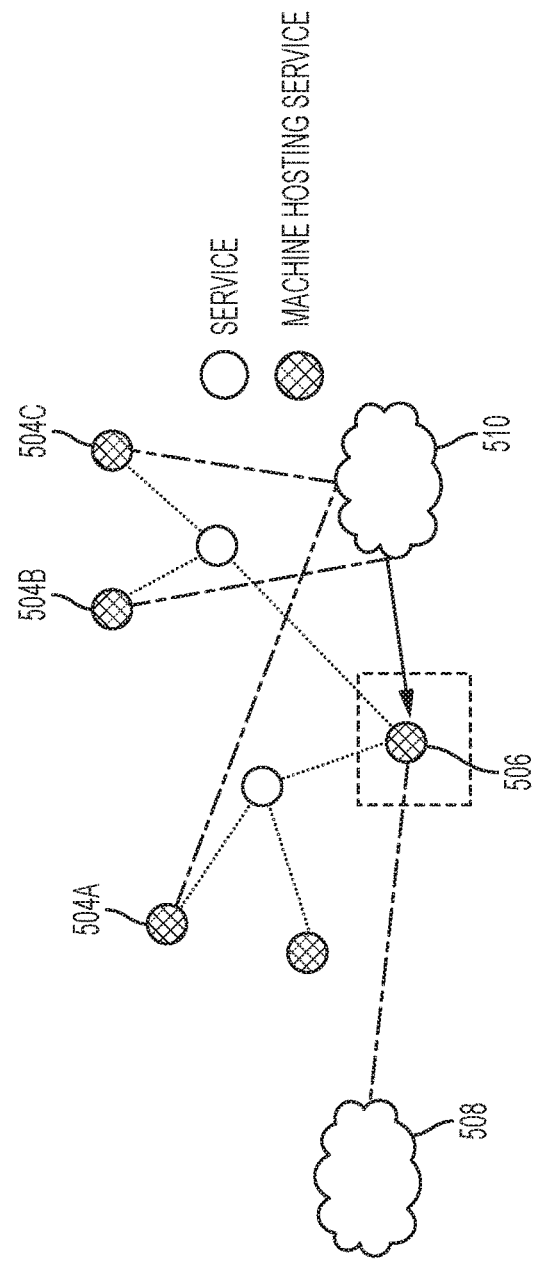
FIG. 8 is a diagram of the example network of FIG. 5 including a linking of word clusters to nodes in accordance with some aspects of the present disclosure.

With reference now to FIG. 8, the log files of the identified sub-network of machines 504 are analyzed to determine whether the key words found in any of the identified thematic or key word clusters 508 and 510 are present. As described above, semantic matching may also be used to identify similar key words. Any machines 504 that include the identified thematic or word clusters 508 or 510 may be linked to the matching thematic or word cluster 508 or 510.

For example, as shown in FIG. 8, cluster 508 is linked only to the most important machine 506 while cluster 510 is linked to the most important machine 506 and additional machines 504A, 504B, and 504C. Any machines that are linked to the clusters 508 and 510 may be machines that may exhibit similar behaviors as the most important machine 506, for example, in a future time period. For example, these machines may be performing some or all of the same tasks as the most important machine 506. Since the most important machine 506 is exhibiting error symptoms that may impact the network 500, these other machines, e.g., machines 504A, 504B, and 504C, that are linked to the clusters 508 and 510 may also be tracked for similar error issues. For example, the linking of one or both of clusters 508 and 510 to both the most important, e.g., error prone, machine 506 and the additional machines 504A-C, may be an early predictor of future anomalous behavior at those machines. The presence of the one or both of the same clusters on machines 504A-C may indicate that one or more of machines 504A-C are likely to fail or incur the same errors as machine 506 in the future.

Figure 9:
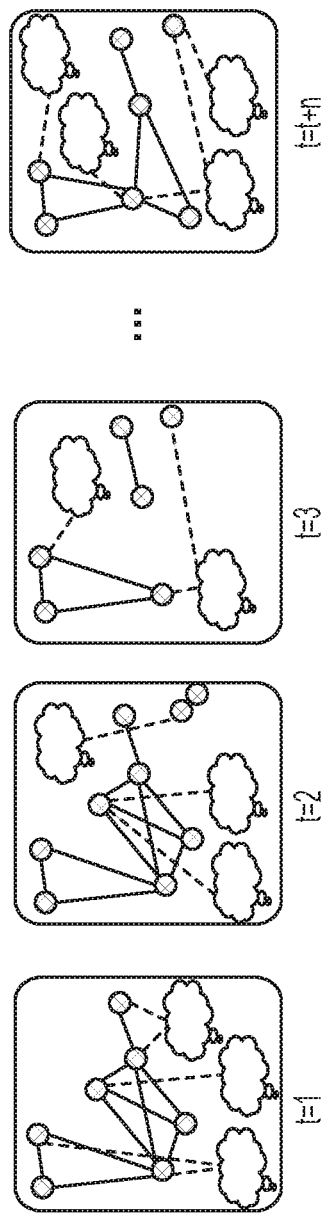
FIG. 9 is a diagram of the example network of FIG. 8 illustrating the evolution of word clusters over time in the network in accordance with some aspects of the present disclosure.

As these clusters are mapped as a function of time in a timer series, diagnosis of behavior leading to a set of errors may be used to predict future degradation of other machines. For example, as illustrated in FIG. 9, the evolution of the word clusters and network 500 may be tracked to determine which machines participate in the anomalous behavior.

Figure 10:
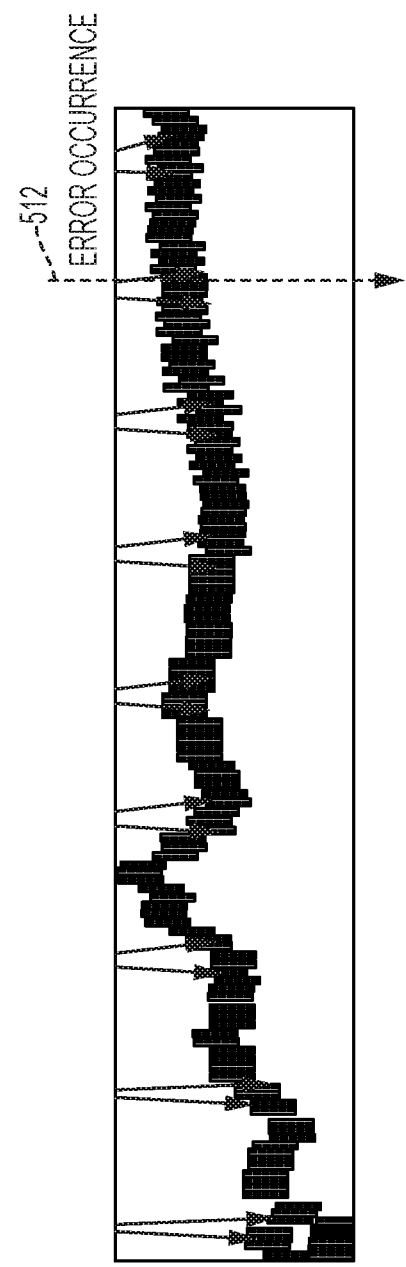
FIG. 10 is an illustration of a time series of a network including a predicted error occurrence in accordance with some aspects of the present disclosure.

With reference now to FIG. 10, as the log files and associated attributes of each machine 504 in network 500 evolve over time, the anomalous behavior may be tracked and characterized using word clustering and the identification of one or more most important machines. This enables a predictive error model to be used to predict future occurrences of errors in the network 500. For example, a future error occurrence 512 may be predicted as illustrated in FIG. 10 and corrective action may be taken to avoid or mitigate the error thereby improving the reliability of the network.

For example, in some aspects a service call may be made to service the machine that is causing or may in the future cause the anomalous behavior. In some aspects, data regarding the evolution of the word clusters in the network may be provided to service personnel for assisting in diagnosing and treating the error. In some aspects, corrective action may be taken automatically by the system where, for example, the system may re-boot, re-install or replace software packages, re-install or update firmware, or take other similar actions on the machine 504 exhibiting or predicted to exhibit the anomalous behavior. In this manner potential failure of some or all of the network may be avoided.

By tracking the evolution of topics in the manners described above, the quality of evolution tracking may be increased because additional relationships and alternatives in concepts may be found or derived. For example, the specialized data structure implementing the storing and tracking of the particular configurations and connections found in the time series graphs illustrated in FIGS. 2-4 may be used to efficiently track the evolution of topics over time.

Figure 11:
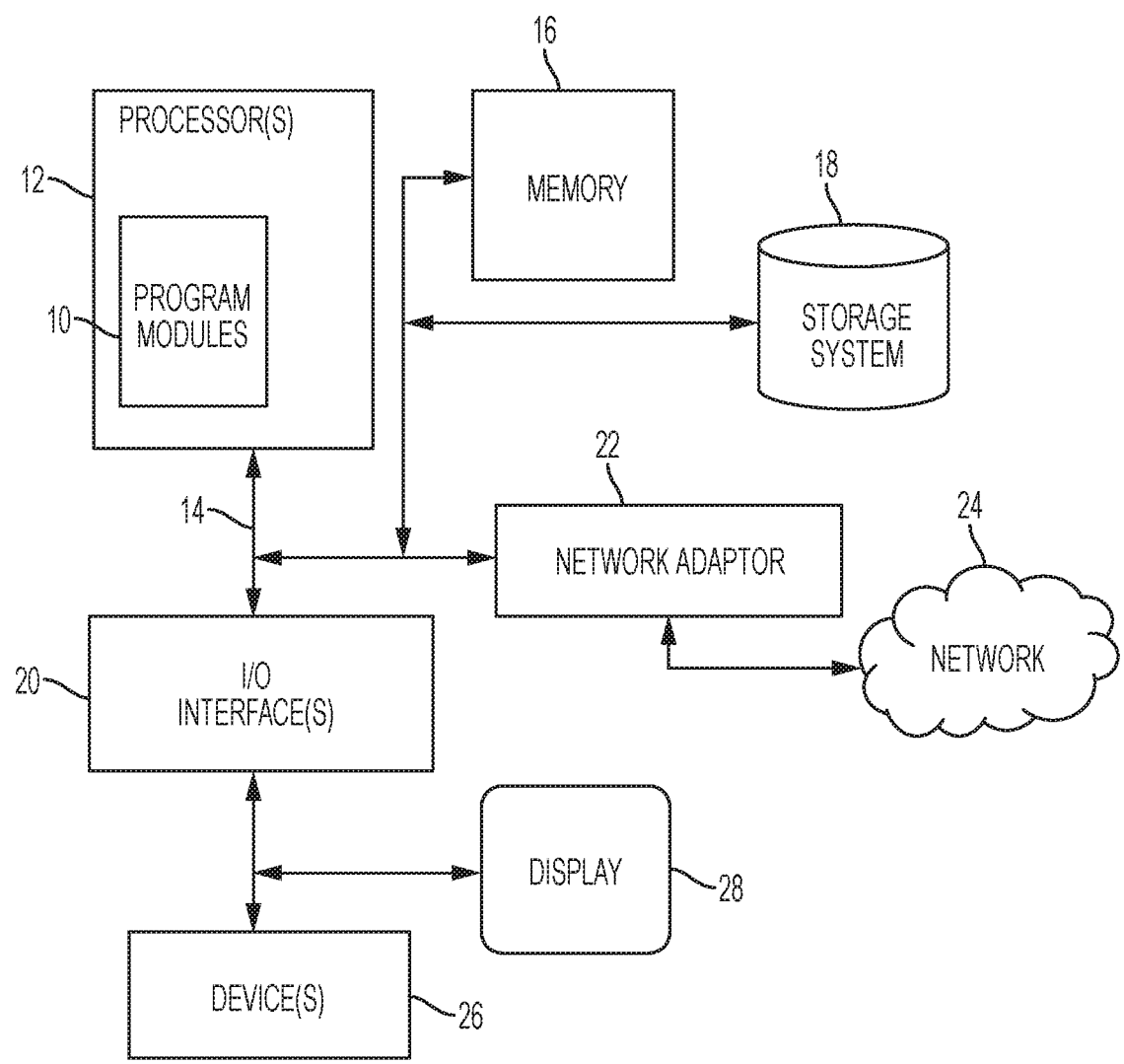
FIG. 11 is an example block diagram of a computer system in which processes involved in the system, method, and computer program product described herein may be implemented.

FIG. 11 illustrates a schematic of an example computer or processing system that may implement any portion of system 100, computing device 110, network 150, systems, methods, and computer program products described herein in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a software module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method implemented by at least one hardware processor comprising:
    receiving time series data associated with a network, the time series data comprising data about the network at a plurality of time slices, the network comprising a plurality of nodes at each time slice, each node at each time slice comprising an attribute associated with at least one media corpus, wherein the nodes in the network and edges connecting the nodes in the network change over time, each node may alternatively include a single attribute that is associated with more than one media corpus, wherein said at least one media corpus associated with the node's attribute changes over time, wherein said at least one media corpus can be deleted from the node's attribute and another one of media corpus can be added to the node's attribute;
    analyzing the time series data to identify at least one most important node in the network for each time slice, the at least one most important node identified as having a largest number of edges connecting to other nodes at least at one time slice;
    determining a sub-network of the network at each time slice based on the identified at least one most important node at each time slice, the sub-network comprising at least some of the nodes of the network and the identified at least one most important node;
    analyzing the at least one media corpus associated with the attribute of each node in the sub-network at each time slice to determine at least one key word cluster for that time slice, each key word cluster comprising a plurality of key words;
    comparing the at least one key word cluster of a first time slice of the plurality of time slices to the at least one key word cluster of a second time slice of the plurality of time slices;
    wherein a strength of the comparison can be determined and used to track the evolution of the keywords and word clusters between time slices through examination of word clusters in subsequent time slices;
    determining based on the comparison, a similarity between the first time slice and the second time slice; and
    wherein the at least one key word cluster for a time slice of the plurality of time slices is linked to at least one of the nodes included in the sub-network at that time slice, the linking based on the inclusion of the plurality of key words in the at least one key word cluster for the time slice in the media corpus associated with the attribute of the at least one of the nodes included in the sub-network at the time slice, wherein a link between the at least one key word cluster to the at least one of the nodes changes over time, wherein how the key words change over time may be classified by a type of evolution of the key words for each word cluster based on a similarity score, wherein evolution types include merge, same, disappear, split, reappear, similar, and new, wherein the at least one key word cluster can be de-linked from the at least one of the nodes and linked to another one of the nodes in another time slice.

2. The method of claim 1, wherein determining the similarity between the first time slice and the second time slice comprises determining similarity scores between each word cluster of the first time slice and each word cluster of the second time slice.

3. The method of claim 2, further comprising aggregating the determined similarity scores together to determine the similarity between the first time slice and the second time slice.

4. The method of claim 2, wherein determining the similarity score between each word cluster of the first time slice and each word cluster of the second time slice comprises determining whether the plurality of key words included in each word cluster match.

5. The method of claim 4, wherein the determination of whether the plurality of key words included in each word cluster match is based on semantic matching.

6. The method of claim 1, further comprising:
    determining, based on the determined similarity between the first time slice and the second time slice that corrective action is required; and
    taking corrective action on the network in response to the determination that corrective action is required.

7. The method of claim 1, wherein analyzing the time series data to identify at least one most important node in the network for each time slice comprises analyzing the time series data using at least one of fragmentation rank, centrality, betweenness, closeness, rumor centrality, information centrality, eigenvalue metric, and page rank.

8. The method of claim 1, wherein analyzing the at least one media corpus associated with the attribute of each node in the sub-network at each time slice to determine the at least one key word cluster for that time slice comprises analyzing the at least one media corpus using at least one of word or section embedding, frequency weighting, natural language processing, and unsupervised clustering.

9. A computer readable storage medium comprising instructions that, when executed by at least one processor comprising hardware, configure the at least one processor to:
    receive time series data associated with a network, the time series data comprising data about the network at a plurality of time slices, the network comprising a plurality of nodes at each time slice, each node at each time slice comprising an attribute associated with at least one media corpus, wherein the nodes in the network and edges connecting the nodes in the network change over time, each node may alternatively include a single attribute that is associated with more than one media corpus, wherein said at least one media corpus associated with the node's attribute changes over time, wherein said at least one media corpus can be deleted from the node's attribute and another one of media corpus can be added to the node's attribute;
    analyze the time series data to identify at least one most important node in the network for each time slice, the at least one most important node identified as having a largest number of edges connecting to other nodes at least at one time slice;

determine a sub-network of the network at each time slice based on the identified at least one most important node at each time slice, the sub-network comprising at least some of the nodes of the network and the identified at least one most important node;

analyze the at least one media corpus associated with the attribute of each node in the sub-network at each time slice to determine at least one key word cluster for that time slice, each key word cluster comprising a plurality of key words;

compare the at least one key word cluster of a first time slice of the plurality of time slices to the at least one key word cluster of a second time slice of the plurality of time slices;

wherein a strength of the comparison can be determined and used to track the evolution of the keywords and word clusters between time slices through examination of word clusters in subsequent time slices;

determine based on the comparison, a similarity between the first time slice and the second time slice; and wherein the at least one key word cluster for a time slice of the plurality of time slices to at least one of the nodes included in the sub-network at that time slice, the linking based on the inclusion of the plurality of key words in the at least one key word cluster for the time slice in the media corpus associated with the attribute of the at least one of the nodes included in the sub-network at the time slice, wherein a link between the at least one key word cluster to the at least one of the nodes changes over time, wherein how the key words chance over time may be classified by a type of evolution of the key words for each word cluster based on a similarity score, wherein evolution types include merge, same, disappear, split, reappear, similar, and new, wherein the at least one key word cluster can be de-linked from the at least one of the nodes and linked to another one of the nodes in another time slice.

10. The computer readable storage medium of claim 9, wherein determining the similarity between the first time slice and the second time slice comprises determining similarity scores between each word cluster of the first time slice and each word cluster of the second time slice.

11. The computer readable storage medium of claim 10, the instructions further configuring the at least one processor to aggregate the determined similarity scores together to determine the similarity between the first time slice and the second time slice.

12. The computer readable storage medium of claim 10, wherein determining the similarity score between each word cluster of the first time slice and each word cluster of the second time slice comprises determining whether the plurality of key words included in each word cluster match.

13. The computer readable storage medium of claim 12, wherein the determination of whether the plurality of key words included in each word cluster match is based on semantic matching.

14. The computer readable storage medium of claim 9, the instructions further configuring the at least one processor to:
determine, based on the determined similarity between the first time slice and the second time slice that corrective action is required; and
take corrective action on the network in response to the determination that corrective action is required.

15. The computer readable storage medium of claim 9, wherein analyzing the time series data to identify at least one most important node in the network for each time slice comprises analyzing the time series data using at least one of fragmentation rank, centrality, betweenness, closeness, rumor centrality, information centrality, eigenvalue metric, and page rank.

16. The computer readable storage medium of claim 9, wherein analyzing the at least one media corpus associated with the attribute of each node in the sub-network at each time slice to determine the at least one key word cluster for that time slice comprises analyzing the at least one media corpus using at least one of word or section embedding, frequency weighting, natural language processing, and unsupervised clustering.

17. A system comprising at least one processor comprising hardware, the at least one processor configured to:
receive time series data associated with a network, the time series data comprising data about the network at a plurality of time slices, the network comprising a plurality of nodes at each time slice, each node at each time slice comprising an attribute associated with at least one media corpus, wherein the nodes in the network and edges connecting the nodes in the network change over time, each node may alternatively include a single attribute that is associated with more than one media corpus, wherein said at least one media corpus associated with the node's attribute changes over time, wherein said at least one media corpus can be deleted from the node's attribute and another one of media corpus can be added to the node's attribute;

analyze the time series data to identify at least one most important node in the network for each time slice, the at least one most important node identified as having a largest number of edges connecting to other nodes at least at one time slice;

determine a sub-network of the network at each time slice based on the identified at least one most important node at each time slice, the sub-network comprising at least some of the nodes of the network and the identified at least one most important node;

analyze the at least one media corpus associated with the attribute of each node in the sub-network at each time slice to determine at least one key word cluster for that time slice, each key word cluster comprising a plurality of key words;

compare the at least one key word cluster of a first time slice of the plurality of time slices to the at least one key word cluster of a second time slice of the plurality of time slices;

wherein a strength of the comparison can be determined and used to track the evolution of the keywords and word clusters between time slices through examination of word clusters in subsequent time slices;

determine based on the comparison, a similarity between the first time slice and the second time slice; and wherein the at least one key word cluster for a time slice of the plurality of time slices is linked to at least one of the nodes included in the sub-network at that time slice, the linking based on the inclusion of the plurality of key words in the at least one key word cluster for the time slice in the media corpus associated with the attribute of the at least one of the nodes included in the sub-network at the time slice, wherein a link between the at least one key word cluster to the at least one of the nodes changes over time, wherein how the key words change over time may be classified by a type of evolution of the key words for each word cluster based on a similarity score, wherein evolution types include merge, same, disappear, split, reappear, similar, and new, wherein the at least one key word cluster can be de-linked from the at least one of the nodes and linked to another one of the nodes in another time slice.

18. The system of claim 17, wherein determining the similarity between the first time slice and the second time slice comprises determining a similarity score between each word cluster of the first time slice and each word cluster of the second time slice, the at least one processor further configured to aggregate the determined similarity scores together to determine the similarity between the first time slice and the second time slice.

* * * * *